J. O'DONNELL, Jr.
SIGNAL FOR AUTOS AND OTHER VEHICLES.
APPLICATION FILED DEC. 16, 1919.
1,342,181. Patented June 1, 1920.
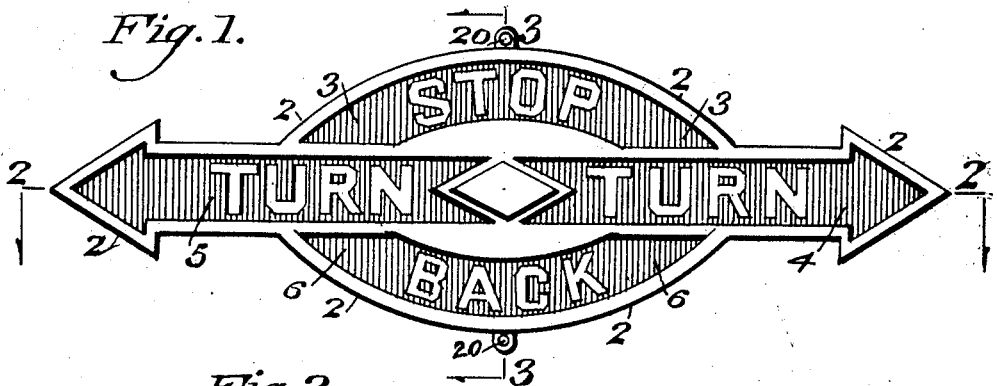
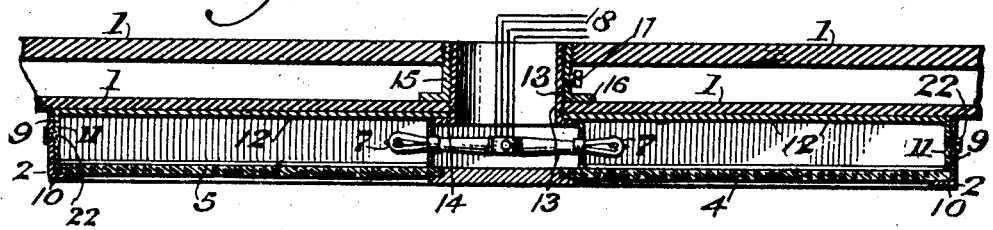
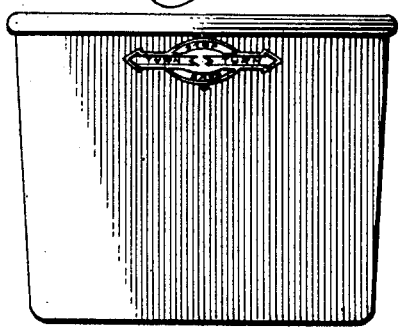
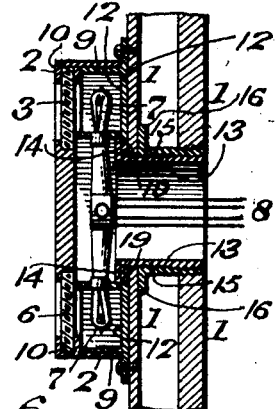
INVENTOR:
John O'Donnell Jr.
BY Wiedersheim + Fairbanks
ATTORNEYS.

UNITED STATES PATENT OFFICE.

JOHN O'DONNELL, JR., OF PHILADELPHIA, PENNSYLVANIA, ASSIGNOR OF ONE-HALF TO LOUIS H. BROWN, OF PHILADELPHIA, PENNSYLVANIA.

SIGNAL FOR AUTOS AND OTHER VEHICLES.

1,342,181.   Specification of Letters Patent.   Patented June 1, 1920.

Application filed December 16, 1919. Serial No. 345,179.

*To all whom it may concern:*

Be it known that I, JOHN O'DONNELL, Jr., a citizen of the United States, residing in the city and county of Philadelphia, State of Pennsylvania, have invented a new and useful Signal for Autos and other Vehicles, of which the following is a specification.

My invention consists of a signal for an auto or other vehicle so as to indicate to an approaching vehicle from the rear the fact that the vehicle in advance is to turn to the right or left, to stop or back, the means employed and the operation of the same being hereinafter set forth.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents an elevation of a signal embodying my invention.

Fig. 2 represents a central, horizontal, longitudinal section thereof on line 2—2 Fig. 1.

Fig. 3 represents a central vertical section thereof on line 3—3 Fig. 1.

Fig. 4 represents a rear view of a portion of a vehicle having the invention applied thereto on a reduced scale.

Fig. 5 represents a perspective view of the fastening devices for the signal detached from the vehicle.

Fig. 6 represents an elevation of a portion of a signal different from that shown in Fig. 1.

Fig. 7 represents a horizontal section of a modification of the invention.

Similar numerals of reference indicate corresponding parts in the figures.

Referring to the drawings—

1 designates portions of the rear walls of an auto or other vehicle to which the signal embodying my invention is applicable, said signal consisting of the frame 2 in which are plates 3, 4, 5 and 6, say of glass colored on their outer faces and on which latter are ground-off signal words as follows:—"Stop," "Turn" and "Back" the frame being divided into sections separated from each other so that each of the above named words appears in its own section, and each section having therein an electric lamp 7 so that each section may be illuminated and so each of said words may have the light of its lamp reflected through its plate and made visible to the occupant of a vehicle approaching from the rear whereby the chauffeur or driver of said vehicle may be signaled to know the movement of the vehicle in front whether it be to "turn to the right" or "to the left," "to stop," or "back." The lamps have connected with them the electric wires or conductors 8 which extend from within reach of the chauffeur or driver and are connected thereat by switches or push buttons whereby the proper lamp may be energized and the distinctive signal made apparent to the chauffeur or driver of the approaching vehicle so as to govern himself accordingly.

The frame 2 consists of two members, the front one being composed of the side wall 9 and the front rim 10 and the rear member being composed of the side wall 11 and back 12, thus forming a chamber in whose sections are placed the glass plates and electric lights, as most plainly shown in Figs. 2 and 3. The back 12 is placed against the adjacent wall 1 of the body of the vehicle and has therein an opening in which is fitted the thimble 13 whose rear end is formed with the flange 14 which is fitted on the wall of said opening in the back. The two walls of said body have therein an opening through which said thimble passes, said opening having also therein the thimble 15 which telescopically receives the thimble 13 and its rear end is formed with the flange 16 which rests against the inner face of the outer wall 1 of the body of the vehicle, said thimbles being screw threaded so as to be screwed together and to the respective portions of the back 12, and walls 1, whereby they may clamp said parts and so hold the signal device firmly in position on the body of the vehicle. To prevent the thimbles from being unscrewed I employ the screw 17 which is passed through the side of the outer thimble and has its point adapted to tighten against the inner thimble. As it is important to hold the signal device firmly on the vehicle owing to the shaking of the latter when running, the back 12 of the frame of said device has in the wall of the opening 17ª which receives the thimble 13 the outturned slots 18, and the flange 14 of said thimble has on its inner side the tongues 19 which are adapted to enter the slots 18 and so assist in preventing the turning of the thimble on the signal device and vice versa. To assist further in holding the device on the auto body I provide the back of the frame 2 with eyes 20 which are adapted to be screwed to the adjacent wall of the body of the vehicle, the effect of which is evident.

In Figs. 1, 2, and 3, the frame 1 is formed of metal and the signal words are formed on the glass plate as has been stated, while in Fig. 6, the signal words are cut-out somewhat stencil-like on the metal frame, and a plate of colored glass is placed back of the same.

In Fig. 7 the back wall of the body of the vehicle is swaged or stamped out to form the chamber 21 in which the signal device is placed and retained.

The members of the frame 2 are united by the screws 22 on the sides thereof which when removed permit the disconnection of said member and entrance into said frame for access to the lamps and other appurtenances for purposes requiring the same.

Having thus described my invention what I claim as new and desire to secure by Letters Patent, is:—

1. A vehicle signal for the purpose described, consisting of a divisional frame, transparent plates, and electric lights in each division of said frame, the back of said frame having an opening, a thimble in said opening and having a flange, a thimble telescopically receiving said first-named thimble and having a flange, said thimbles being secured together and adapted to be engaged with the rear wall of a vehicle body and the signal clamped against the outer wall thereof by said flanges.

2. A vehicle signal for the purpose described, consisting of a divisional frame, transparent plates, and electric lights in each division of said frame, the back of said frame having an opening, a thimble in said opening and having a flange, a thimble telescopically receiving said first-named thimble and having a flange, said thimbles being screw-threaded together and adapted to be engaged with the rear wall of a vehicle body and the signal clamped against the outer wall thereof by said flanges, and interengaging tongues and slots to prevent turning of the thimbles.

3. In a vehicle signal for the purpose described consisting of a frame, indicating signal characters in said frame, transparent plates in said frame, illuminating devices in said frame, and means for securing said frame to a proper portion of a vehicle consisting of telescopically fitted thimbles, the latter being connected with each other and with said portion of a vehicle, with the rear wall of the signal casing clamped against the outer wall of the vehicle by said flanges, and interengaging means to prevent turning of the thimbles.

4. In a vehicle signal for the purpose described consisting of a frame, indicating signal characters in said frame, transparent plates in said frame, illuminating devices in said frame, and means for securing said frame to a proper portion of a vehicle consisting of telescopically fitted thimbles, the latter being connected with each other and with said portion of a vehicle, said thimbles being each provided with flanges adapted to clamp the parts with which they contact and to clamp the rear wall of the signal casing against the outer wall of the vehicle, and interengaging means to prevent turning of the thimbles.

5. A vehicle signal for the purpose described consisting of a frame, and indicating signal characters therein, and means for connecting said frame with a proper part of a vehicle consisting of a thimble which is attached to the back of said frame and to a proper portion of the vehicle, said back having therein an opening to receive said thimble, and a slot in the wall of said opening, and said thimble having on its peripheral portion a tongue which is adapted interlockingly to occupy said slot.

JOHN O'DONNELL, Jr.

Witnesses:
JOHN A. WIEDERSHEIM,
N. BUSSINGER.